June 7, 1927.

L. E. SWETT

METHOD OF MAKING SAWS

Filed Oct. 23, 1925

1,631,657

WITNESS:
Robt R Ketchel.

INVENTOR
Lewis E. Swett
BY
Augustus B. Stoughton

Patented June 7, 1927.

1,631,657

UNITED STATES PATENT OFFICE.

LEWIS E. SWETT, OF YORK, PENNSYLVANIA, ASSIGNOR TO PENNSYLVANIA STAMPING CORPORATION, OF YORK, PENNSYLVANIA, A CORPORATION OF DELAWARE.

METHOD OF MAKING SAWS.

Application filed October 23, 1925. Serial No. 64,394.

The principal object of the present invention is to provide for the manufacture of good saws that may be sold at a comparatively low price.

Another object of the invention is to provide a simple, expeditious and efficient method for producing such saws not only by a comparatively few operations but also in such a way that their teeth are in sharp condition for cutting.

Other objects of the invention will appear from the following description at the end of which the invention will be claimed.

The invention may be said to consist in the method of making saws which comprises die cutting alternate tooth root spaces on both edges of a blank adapted to provide two saws at a single operation and in one direction, then die cutting intermediate tooth root spaces on both edges of the blank at a single operation and in the other direction thus providing teeth each burred on its leading face, then die setting the teeth, and finally cutting the blank into two saws.

In describing the invention reference will be made to the accompanying drawing forming part hereof and in which Figure 1 illustrates a blank adapted to provide two saws and showing on its opposite edges in full lines the tooth root spaces made by the first die cutting in one direction and by dotted lines the intermediate tooth root spaces made in the second step by die cutting in the opposite direction.

Figure 1:
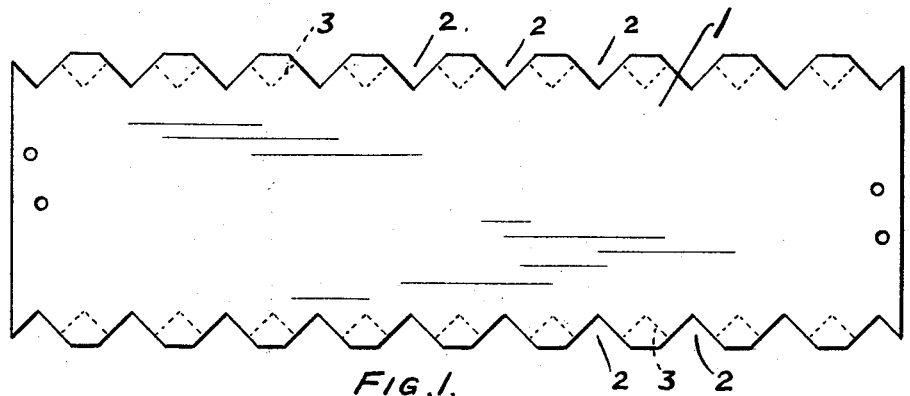
Figure 2:
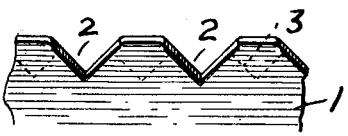
Fig. 2 is an edge view in perspective showing the edge of the blank as it appears in Fig. 1 and indicating by dotted lines the result of the second step.
Figure 3:
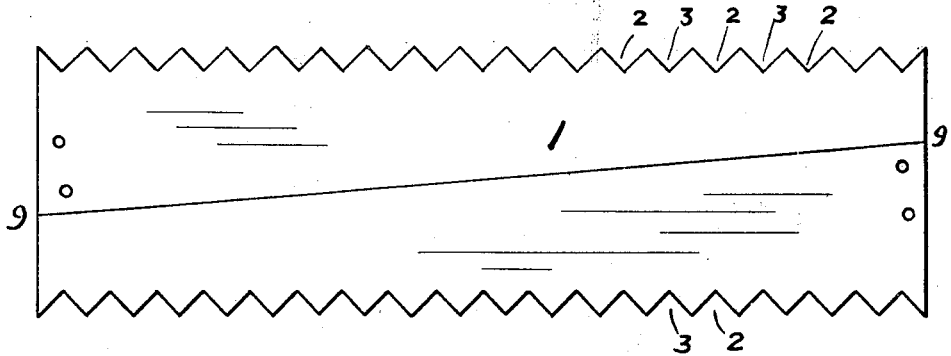
Fig. 3 is a view of the blank showing the saw teeth and indicating where the blank is cut after the teeth have been set to provide two saws.
Figure 4:
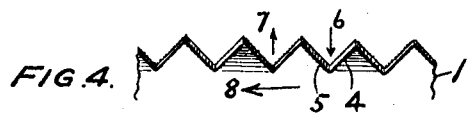
Fig. 4 is a perspective view showing the burr which provides sharpening on the leading face of each tooth.
Figure 5:
Fig. 5 is an edge view after the teeth have been set.

Referring to the drawing, 1 is a blank preferably of high carbon steel, and it is large enough to provide two saws. 2 indicates the alternate tooth root spaces die cut on each edge of the blank at a single operation. 3 indicates the intermediate tooth root spaces die cut on both edges of the blank at a second single operation. The tooth root spaces 2 are die cut in one direction and the tooth root spaces 3 are die cut in the other direction. One way of doing this is to turn the blank upsidedown between the two die cutting operations, and the object is to provide a burr, as indicated at 4 and 5 in Fig. 4, on the leading face of each tooth, thus sharpening the saw. In Fig. 4 the arrows 6 and 7 indicate the directions of the cuts and the arrow 8 indicates the direction of the cutting stroke of the saw. The teeth die cut as described are set by a single operation of die stamping or bending and then the blank is cut in substantially the general direction indicated by the line 9—9, thus providing two saws.

It will be apparent to those skilled in the art to which the invention relates that modifications may be made in details of procedure and in matters of mere form without departing from the spirit of the invention which is not limited as to those matters or otherwise than as the prior art and the appended claims may require.

I claim:

1. The process of making saws which consists in die cutting alternate tooth root spaces on both edges of a bank at one operation and in one direction, thereby providing burrs, die cutting intermediate tooth root spaces on both edges of the blank at a single operation and in the opposite direction, thereby providing oppositely arranged burrs setting the teeth thus provided at another operation, and cutting the blank to provide two saws.

2. The method of making saws which consists in die cutting alternate tooth root spaces on both edges of a blank at a single operation, thereby providing burrs, inverting the blank, die cutting intermediate tooth root spaces on each edge of the blank at a single operation, thereby providing oppositely arranged burrs setting the teeth appropriately for presenting a burred portion of each tooth on the leading faces of the teeth, and separating the blank into two saws.

LEWIS E. SWETT.